United States Patent
Nishida et al.

(10) Patent No.: US 8,725,061 B2
(45) Date of Patent: May 13, 2014

(54) MESSAGE DISTRIBUTION METHOD, RADIO BASE STATION, AND MESSAGE DISTRIBUTION STATION

(75) Inventors: Katsutoshi Nishida, Tokyo (JP); Itsuma Tanaka, Yokohama (JP); Wuri Andarmawanti Hapsari, Yokosuka (JP); Tadashi Uchiyama, Miura (JP)

(73) Assignee: NTT DoCoMo, Inc., Tokyo (JP)

( * ) Notice: Subject to any disclaimer, the term of this patent is extended or adjusted under 35 U.S.C. 154(b) by 407 days.

(21) Appl. No.: 13/059,782

(22) PCT Filed: Aug. 18, 2009

(86) PCT No.: PCT/JP2009/064455
§ 371 (c)(1),
(2), (4) Date: May 5, 2011

(87) PCT Pub. No.: WO2010/021325
PCT Pub. Date: Feb. 25, 2010

(65) Prior Publication Data
US 2011/0207394 A1    Aug. 25, 2011

(30) Foreign Application Priority Data
Aug. 18, 2008 (JP) ................. 2008-210198

(51) Int. Cl.
*H04H 20/71* (2008.01)

(52) U.S. Cl.
USPC .............. 455/3.01; 455/404.1; 455/414.3; 455/418

(58) Field of Classification Search
CPC .......... H04W 4/06; H04W 4/021; H04W 4/22
USPC ........................................ 455/3.01
See application file for complete search history.

(56) References Cited

U.S. PATENT DOCUMENTS

| | | | | |
|---|---|---|---|---|
| 6,329,904 B1 * | 12/2001 | Lamb | ...... | 340/286.02 |
| 6,617,964 B1 * | 9/2003 | Lamb | ...... | 340/286.02 |
| 6,867,688 B2 * | 3/2005 | Lamb | ...... | 340/286.02 |
| 6,924,774 B2 * | 8/2005 | Komatsu et al. | ...... | 343/767 |
| 6,930,645 B2 * | 8/2005 | Komatsu et al. | ...... | 343/713 |
| 7,019,699 B2 * | 3/2006 | Komatsu et al. | ...... | 343/711 |
| 7,023,979 B1 * | 4/2006 | Wu et al. | ...... | 379/265.11 |

(Continued)

FOREIGN PATENT DOCUMENTS

JP    2001-274830 A    10/2001

OTHER PUBLICATIONS

Office Action in corresponding Chinese application No. 200980132117.2 dated Apr. 3, 2013 (12 pages).

(Continued)

*Primary Examiner* — Hai V Nguyen
(74) *Attorney, Agent, or Firm* — Osha Liang LLP

(57) ABSTRACT

A message distribution method according to the present invention includes the steps of: (A) determining, at a message distribution station (CBC), distribution area information and a distribution type, based on a message distribution request received from a flash report transmission station (CBE) and containing distribution target area information, and reporting, from the message distribution station (CBC) to a radio base station (eNB), the distribution area information and the distribution; and (B) determining, at the radio base station (eNB), the distribution area, based on the distribution area information and the distribution type, and distributing, from the radio base station to the mobile station in the distribution area, a predetermined message.

2 Claims, 5 Drawing Sheets

(56) References Cited

U.S. PATENT DOCUMENTS

| | | | |
|---|---|---|---|
| 7,058,385 B2* | 6/2006 | Lauper | 455/404.1 |
| 7,103,643 B1* | 9/2006 | Jacobs et al. | 709/219 |
| 7,212,506 B2* | 5/2007 | Varney et al. | 370/329 |
| 7,283,045 B1* | 10/2007 | Manz | 340/506 |
| 7,305,325 B2* | 12/2007 | Kostyk et al. | 702/183 |
| 7,321,338 B2* | 1/2008 | Komatsu et al. | 343/846 |
| 7,339,467 B2* | 3/2008 | Lamb | 340/539.1 |
| 7,558,558 B2* | 7/2009 | Langsenkamp et al. | 455/404.1 |
| 7,598,850 B2* | 10/2009 | Manz | 340/506 |
| 7,602,281 B2* | 10/2009 | Manz et al. | 340/505 |
| 7,630,864 B2* | 12/2009 | Shoenfeld | 702/188 |
| 7,764,185 B1* | 7/2010 | Manz et al. | 340/601 |
| 7,872,573 B2* | 1/2011 | Lamb | 340/539.1 |
| 7,907,930 B2* | 3/2011 | Grevers, Jr. | 455/404.1 |
| 8,073,422 B2* | 12/2011 | Langsenkamp et al. | 455/404.1 |
| 8,095,610 B2* | 1/2012 | Gould et al. | 709/207 |
| 8,135,413 B2* | 3/2012 | Dupray | 455/456.1 |
| 8,219,134 B2* | 7/2012 | Maharajh et al. | 455/519 |
| 8,438,388 B2* | 5/2013 | Thomas et al. | 713/168 |
| 2002/0041328 A1* | 4/2002 | LeCompte et al. | 348/144 |
| 2002/0086659 A1* | 7/2002 | Lauper | 455/404 |
| 2003/0141971 A1* | 7/2003 | Heiken, Jr. | 340/506 |
| 2003/0143974 A1* | 7/2003 | Navarro | 455/404 |
| 2003/0193394 A1* | 10/2003 | Lamb | 340/539.28 |
| 2004/0095954 A1* | 5/2004 | Varney et al. | 370/444 |
| 2004/0135728 A1* | 7/2004 | Komatsu et al. | 343/700 MS |
| 2004/0135731 A1* | 7/2004 | Komatsu et al. | 343/713 |
| 2004/0155825 A1* | 8/2004 | Komatsu et al. | 343/713 |
| 2004/0169605 A1* | 9/2004 | Komatsu et al. | 343/700 MS |
| 2005/0237183 A1* | 10/2005 | Lamb | 340/539.11 |
| 2005/0272368 A1* | 12/2005 | Langsenkamp et al. | 455/12.1 |
| 2005/0272412 A1* | 12/2005 | Langsenkamp et al. | 455/414.2 |
| 2007/0005428 A1* | 1/2007 | Jacobs et al. | 705/14 |
| 2007/0005429 A1* | 1/2007 | Jacobs et al. | 705/14 |
| 2007/0038728 A1* | 2/2007 | Jacobs et al. | 709/219 |
| 2007/0112627 A1* | 5/2007 | Jacobs et al. | 705/14 |
| 2007/0227913 A1* | 10/2007 | Shoenfeld | 206/1.5 |
| 2007/0287473 A1* | 12/2007 | Dupray | 455/456.1 |
| 2008/0052044 A1* | 2/2008 | Shoenfeld | 702/188 |
| 2008/0055068 A1* | 3/2008 | Van Wageningen et al. | 340/539.3 |
| 2008/0186206 A1* | 8/2008 | Reumerman | 340/902 |
| 2008/0195664 A1* | 8/2008 | Maharajh et al. | 707/104.1 |
| 2008/0200154 A1* | 8/2008 | Maharajh et al. | 455/414.3 |
| 2008/0201225 A1* | 8/2008 | Maharajh et al. | 705/14 |
| 2008/0201386 A1* | 8/2008 | Maharajh et al. | 707/201 |
| 2008/0207137 A1* | 8/2008 | Maharajh et al. | 455/74 |
| 2008/0207182 A1* | 8/2008 | Maharajh et al. | 455/414.1 |
| 2008/0261554 A1* | 10/2008 | Keller et al. | 455/404.1 |
| 2008/0316021 A1* | 12/2008 | Manz et al. | 340/539.13 |
| 2008/0316052 A1* | 12/2008 | Ruffini | 340/901 |
| 2009/0023418 A1* | 1/2009 | Grevers, Jr. | 455/404.1 |
| 2009/0029672 A1* | 1/2009 | Manz | 455/404.2 |
| 2009/0058665 A1* | 3/2009 | Lamb | 340/601 |
| 2009/0137222 A1* | 5/2009 | Heen | 455/404.1 |
| 2009/0185489 A1* | 7/2009 | Ruffini et al. | 370/237 |
| 2009/0248828 A1* | 10/2009 | Gould et al. | 709/207 |
| 2009/0249062 A1* | 10/2009 | Thomas et al. | 713/158 |
| 2010/0003953 A1* | 1/2010 | Ray et al. | 455/404.1 |
| 2010/0235748 A1* | 9/2010 | Johnson et al. | 715/730 |
| 2011/0225417 A1* | 9/2011 | Maharajh et al. | 713/150 |
| 2012/0058775 A1* | 3/2012 | Dupray et al. | 455/456.1 |
| 2012/0185897 A1* | 7/2012 | Gould et al. | 725/33 |
| 2012/0208512 A1* | 8/2012 | Maharajh et al. | 455/414.1 |
| 2013/0064527 A1* | 3/2013 | Maharajh et al. | 386/343 |
| 2013/0166580 A1* | 6/2013 | Maharajh et al. | 707/758 |

OTHER PUBLICATIONS

Examination Report in corresponding Indonesian application No. W-00201100957 dated Apr. 5, 2013 (2 pages).

Japanese Office Action for Application No. 2008-210198, mailed on Sep. 15, 2009 (4 pages).

Japanese Office Action for Application No. 2008-210198, mailed on Mar. 9, 2010 (4 pages).

Japanese Office Action for Application No. 2008-210198, mailed on Sep. 7, 2010 (2 pages).

Nokia Siemens Networks, et al., "Warning System Architecture", 3GPP TSG SA WG2 Meeting #66, S2-085143, Montreal, Canada, Jun. 23-27, 2008.

Patent Abstracts of Japan for Japanese Publication No. 2001-274830, publication date Oct. 5, 2001 (1 page).

International Search Report issued in PCT/JP2009/064455, mailed on Sep. 29, 2009 (2 pages).

3GPP TS 23.401 V8.4.0 (Dec. 2008) 3rd Generation Partnership Project; Technical Specification Group Services and System Aspects; General Packet Radio Service (GPRS) Enhancements for Evolved Universal Terrestrial Radio Access Network (E-UTRAN) Access (Release 8).

Office Action for corresponding Chinese Application No. 200980132117.2, mailed Nov. 29, 2013 (9 pages).

* cited by examiner

| DISTRIBUTION TYPE | PREFERENCE CONTROL | DISTRIBUTION AREA INFORMATION | DISTRIBUTION AREA |
|---|---|---|---|
| A | PREFERENTIAL | 0001 | A, B |
| | | 0002 | C, D, E |
| | | 0003 | F, G |
| B | NON-PREFERENTIAL | FFFF0 | A |
| | | FFFF1 | B |
| | | FFFF2 | C |

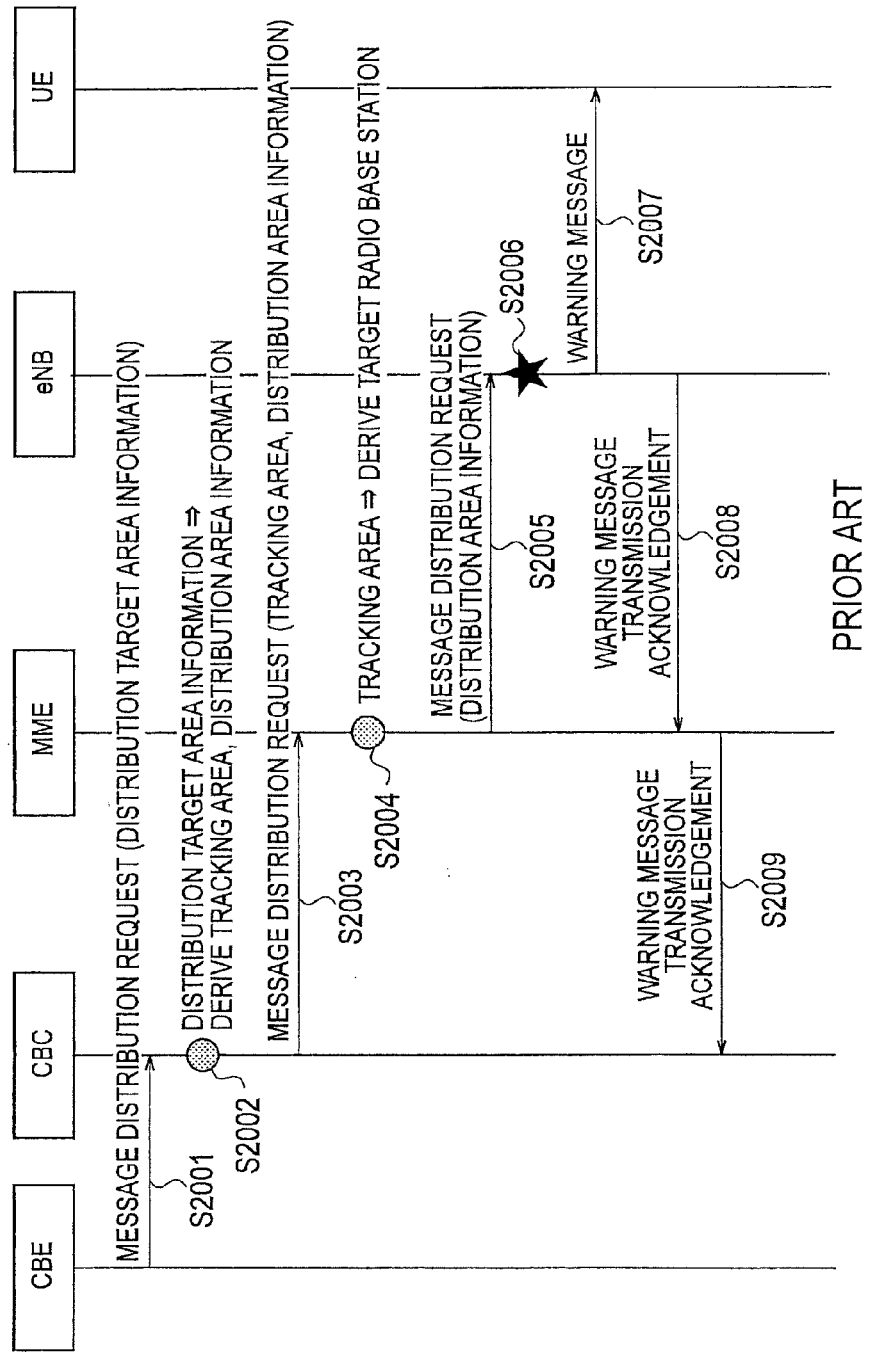

MESSAGE DISTRIBUTION METHOD, RADIO BASE STATION, AND MESSAGE DISTRIBUTION STATION

TECHNICAL FIELD

The present invention relates to a message distribution method, a radio base station, and a message distribution station which distribute a predetermined message to a mobile station in a distribution area.

BACKGROUND ART

In the 3GPP, a framework for distributing a warning message to a specific distribution area on a packet switching network (hereinafter referred to as a warning distribution system) is specified.

Referring to FIG. 6, the operation of such a warning message distribution system is described.

As shown in FIG. 6, in step S2001, a flash report transmission station CBE transmits, to a message distribution station CBC, a message distribution request for requesting distribution of a warning message.

In step S2002, the message distribution station CBC determines one or multiple tracking areas (TA), and distribution area information (Warning Area ID), based on distribution target area information contained in the message distribution request.

In step S2003, the message distribution station CBC transmits, to a mobile control apparatus MME corresponding to each tracking area, a message distribution request including the above-mentioned tracking areas and distribution area information.

In step S2004, the mobile control apparatus MME identifies the radio base station eNB belonging to each tracking area contained in the received message distribution request.

In step S2005, the mobile control apparatus MME transmits, to the identified radio base station eNB, a message distribution request including the distribution area information.

In step S2006, the radio base station eNB determines whether the radio base station eNB itself is included in the distribution area for the warning message based on the distribution area information contained in the received message distribution request.

When determining to be included in the distribution area for the warning message, the radio base station eNB distributes the warning message to the mobile stations in the distribution area corresponding to the distribution area information in step S2007, and transmits a warning message transmission acknowledgement which indicates the distribution to the mobile control apparatus MME in step S2008.

In step S2009, the mobile control apparatus MME transfers the warning message transmission acknowledgement received from the radio base station eNB to the message distribution station CBC.

SUMMARY OF THE INVENTION

Problem to be Solved by the Invention

However, in the conventional message distribution system, distribution area information for designating distribution area in a sector unit, and distribution area information for designating distribution area in a broader-area unit (for example, Tokyo Metropolis) cannot coexist.

Accordingly, in the conventional message distribution system, when a distribution area is designated in a sector unit by the distribution area information, and the distribution area is across a broader area, the radio base station eNB needs to perform processing for many pieces of distribution area information, thus there is a problem in that an increase in the processing load on the radio base station eNB and a delay in the distribution of a warning message possibly occur.

Now, the present invention has been made in view of the above-mentioned problem, and it is an object of the invention to provide a message distribution method, a radio base station, and a message distribution station that can flexibly designate a unit for the distribution area.

Solution to Problem

A first aspect of the present invention is summarized as a message distribution method for distributing a predetermined message to a mobile station in a distribution area, including the steps of: (A) determining, at a message distribution station, distribution area information and a distribution type, based on a message distribution request received from a flash report transmission station and containing distribution target area information, and reporting, from the message distribution station to a radio base station, the distribution area information and the distribution; and (B) determining, at the radio base station, the distribution area, based on the distribution area information and the distribution type, and distributing, from the radio base station to the mobile station in the distribution area, the predetermined message.

In the first aspect of the present invention, the step (A) can include the steps of: determining, at the message distribution station, a tracking area, the distribution area information, and the distribution type, based on the message distribution request, and reporting, from the message distribution station to a mobile control apparatus corresponding to the distribution target area, the tracking area, the distribution area information, and the distribution type; and reporting, from the mobile control apparatus to the radio base station belonging to the tracking area, the distribution area information and the distribution type.

In the first aspect of the present invention, the radio base station can manage a table which stores distribution area information and a distribution area in association with each other for each distribution type; and in the step (B), the radio base station can refer to the table corresponding to the distribution type, and distribute the predetermined message to a mobile station in a distribution area associated with the distribution area information.

A second aspect of the present invention is summarized as a radio base station configured to distribute a predetermined message to a mobile station in a distribution area, wherein the radio base station is configured manage a table which stores distribution area information and a distribution area in association with each other for each distribution type; and to refer to the table corresponding to a distribution type reported from a message distribution station, and distribute the predetermined message to a mobile station in a distribution area associated with the distribution area information reported from the message distribution station.

A third aspect of the present invention is summarized as a message distribution station configured to distribute a predetermined message to a mobile station in a distribution area, wherein the message distribution station is configured to determine distribution area information and a distribution type, based on a message distribution request received from a flash report transmission station and containing distribution target area information; and to transmit a message distribution request containing the distribution area information and the distribution type, to a mobile switching center corresponding to the determined distribution area information.

Effect of the Invention

As described above, according to the present invention, it is possible to provide a message distribution method, a radio base station, and a message distribution station that can flexibly designate a unit for the distribution area.

BRIEF DESCRIPTION OF THE DRAWINGS

FIG. 6 is a sequence diagram showing the operation of a general message distribution system.

MODES FOR CARRYING OUT THE INVENTION (Configuration of Message Distribution System according to First Embodiment of the Present Invention)

The configuration of a message distribution system according to the first embodiment of the present invention is described with reference to FIGS. 1 to 4.

Figure 1:
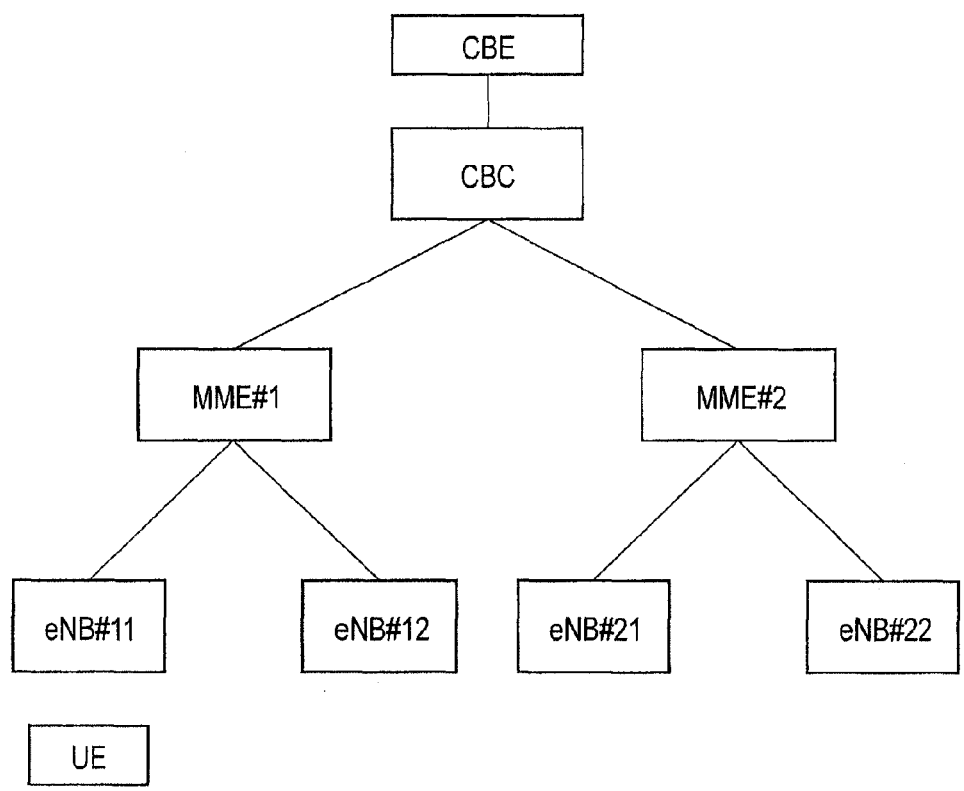
FIG. 1 is an overall configuration diagram of a mobile communication system according to a first embodiment of the present invention.

As shown in FIG. 1, the message distribution system according to the present embodiment includes a flash report transmission station CBE, a message distribution station CBC, a mobile control apparatus MME, a radio base station eNB, and a mobile station UE.

Figure 2:
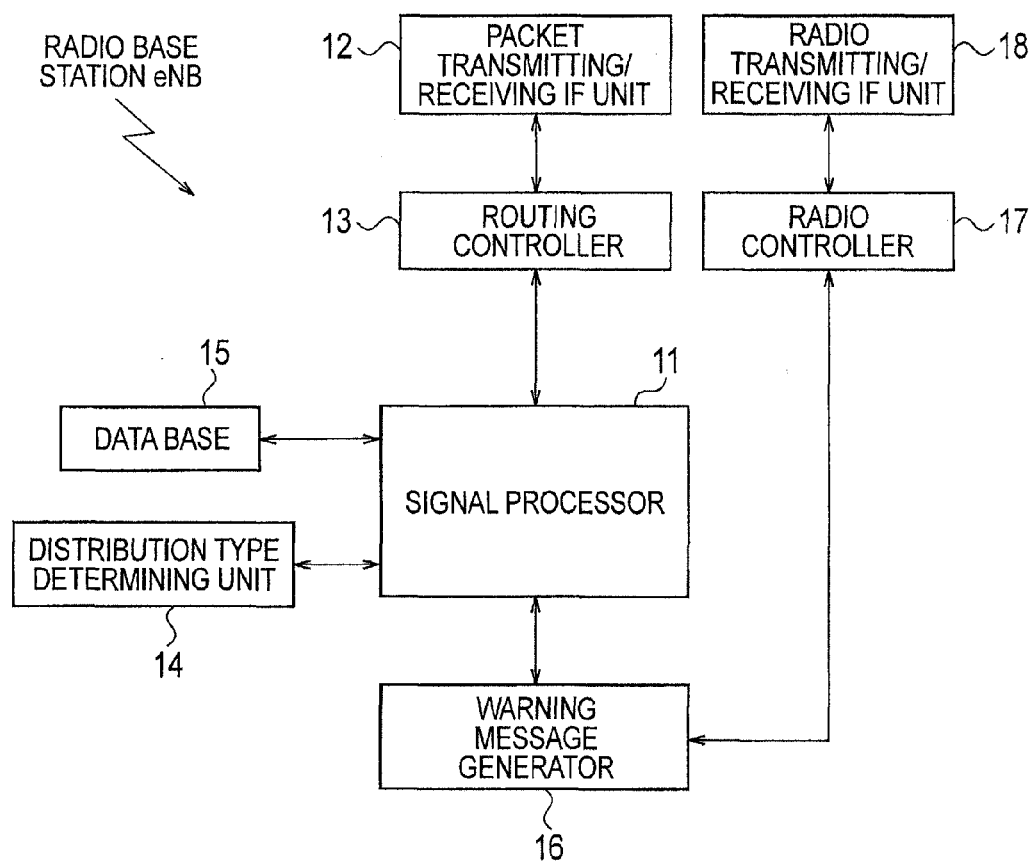
FIG. 2 is a functional block diagram of a radio base station according to the first embodiment of the present invention.

As shown in FIG. 2, the radio base station eNB includes a signal processor unit 11, a packet transmitting/receiving IF unit 12, a routing controller unit 13, a distribution type determining unit 14, a database 15, a warning message generator unit 16, a radio controller unit 17, and a radio transmitting/receiving IF unit 18.

The database 15 manages a table which stores distribution area information and distribution area in association with each other for each distribution type.

Figures 3, 4:
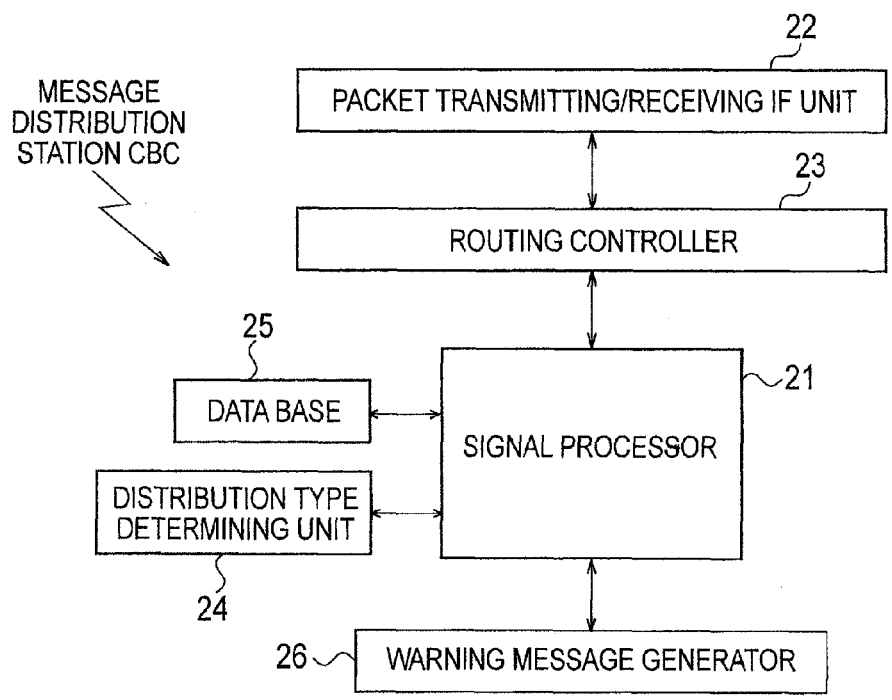
FIG. 3 is a diagram showing an example of a table managed in a database of the radio base station according to the first embodiment of the present invention.
FIG. 4 is a functional block diagram of a message distribution station according to the first embodiment of the present invention.

FIG. 3 shows an example of such a table. The table shown in FIG. 3 is configured in such a manner that "distribution type", "preference control", "distribution area information", and "distribution area" are associated with each other.

The database 15 is configured to send back "preference control" and "distribution area", which are associated with a distribution type and distribution area information, upon receipt of the distribution type and the distribution area information from the signal processor unit 11. Here, the "preferential control" shows whether or not a message distribution request should be processed preferentially.

In the example of FIG. 3, the "distribution area information" contained in a message distribution request containing the distribution type "A" designates a "distribution area" in a broader-area unit, while the "distribution area information" contained in a message distribution request containing the distribution type "B" designates a "distribution area" in a sector unit.

In addition, in the example of FIG. 3, a message distribution request containing the distribution type "A" is processed preferentially, while a message distribution request containing the distribution type "B" is not processed preferentially.

The signal processor unit 11 is configured to receive a message distribution request transmitted by the mobile control apparatus MME via the packet transmitting/receiving IF unit 12 and the routing controller unit 13.

The signal processor unit 11 is configured to analyze the content of the message distribution request and detect its distribution type. Specifically, the signal processor unit 11 is configured to detect the distribution type by referring to the distribution type determining unit 14. Note that the distribution type determining unit 14 may be included in the signal processor unit 11.

Moreover, the signal processor unit 11 searches for the distribution area corresponding to the distribution area information contained in the received message distribution request by referring to the table for the detected distribution type in the database 15.

When a specific distribution area is detected, the signal processor unit 11 transmits a message distribution request to the warning message generator unit 16 along with the detected information about the distribution area.

The warning message generator unit 16 converts the warning message contained in the message distribution request to a warning message for the mobile station UE, and transmits the converted warning message to the mobile stations in the above-mentioned distribution area via the radio controller unit 17 and the radio transmitting/receiving IF unit 18. Note that the warning message generator unit 16 may be included in the signal processor unit 11.

It should be noted that the signal processor unit 11 is configured in such a manner that, when determining that a specific message distribution request should be processed preferentially according to a response from the database 15, the signal processor unit 11 sends the determination to other functional blocks in the radio base station eNB (for example, the warning message generator unit 16, the radio controller unit 17, and the radio transmitting/receiving IF unit 18).

As described above, the radio base station eNB is configured to refer to the table corresponding to the distribution type reported from the message distribution station CBC via the mobile control apparatus MME, and to distribute a warning message (predetermined message) to the mobile stations UE in the distribution area which is associated with the distribution area information reported from the message distribution station CBC via the mobile control apparatus MME.

As shown in FIG. 4, the message distribution station CBC includes a signal processor unit 21, a packet transmitting/receiving IF unit 22, a routing controller unit 23, a distribution type determining unit 24, a database 25, and a warning message generator unit 26.

The signal processor unit 21 is configured to receive a message distribution request via the packet transmitting/receiving IF unit 22 and the routing controller unit 23, the message distribution request being transmitted by the flash report transmission station CBE.

The signal processor unit 21 is configured to analyze the content of the message distribution request and to report information related to generation of a warning message (the warning message type, information on the flash report transmission station of the distribution source, distribution target area information, and the like) to the warning message generator unit 26.

The warning message generator unit 26 is configured to refer to the database 25 based on the information received from the signal processor unit 21, and to derive a tracking area and distribution area information.

The distribution type determining unit 24 may determine the distribution type by receiving, from the signal processor unit 21, the information transmitted from the signal processor unit 21 to the warning message generator unit 26 (the warning message type, information on the flash report transmission station of the distribution source, distribution target area information, and the like) or the information retrieved from the database to be reported to the warning message generator unit 26 (tracking area, distribution area information, and the like).

Note that the distribution type determining unit 24 may be included in the warning message generator unit 26 or in the signal processor unit 21. Also, the warning message generator unit 26 may be included in the signal processor unit 21.

(Operation of Message Distribution System according to First Embodiment of the Present Invention)

The operation of the message distribution system according to the first embodiment of the present invention is described with reference to FIG. 5.

Figure 5:
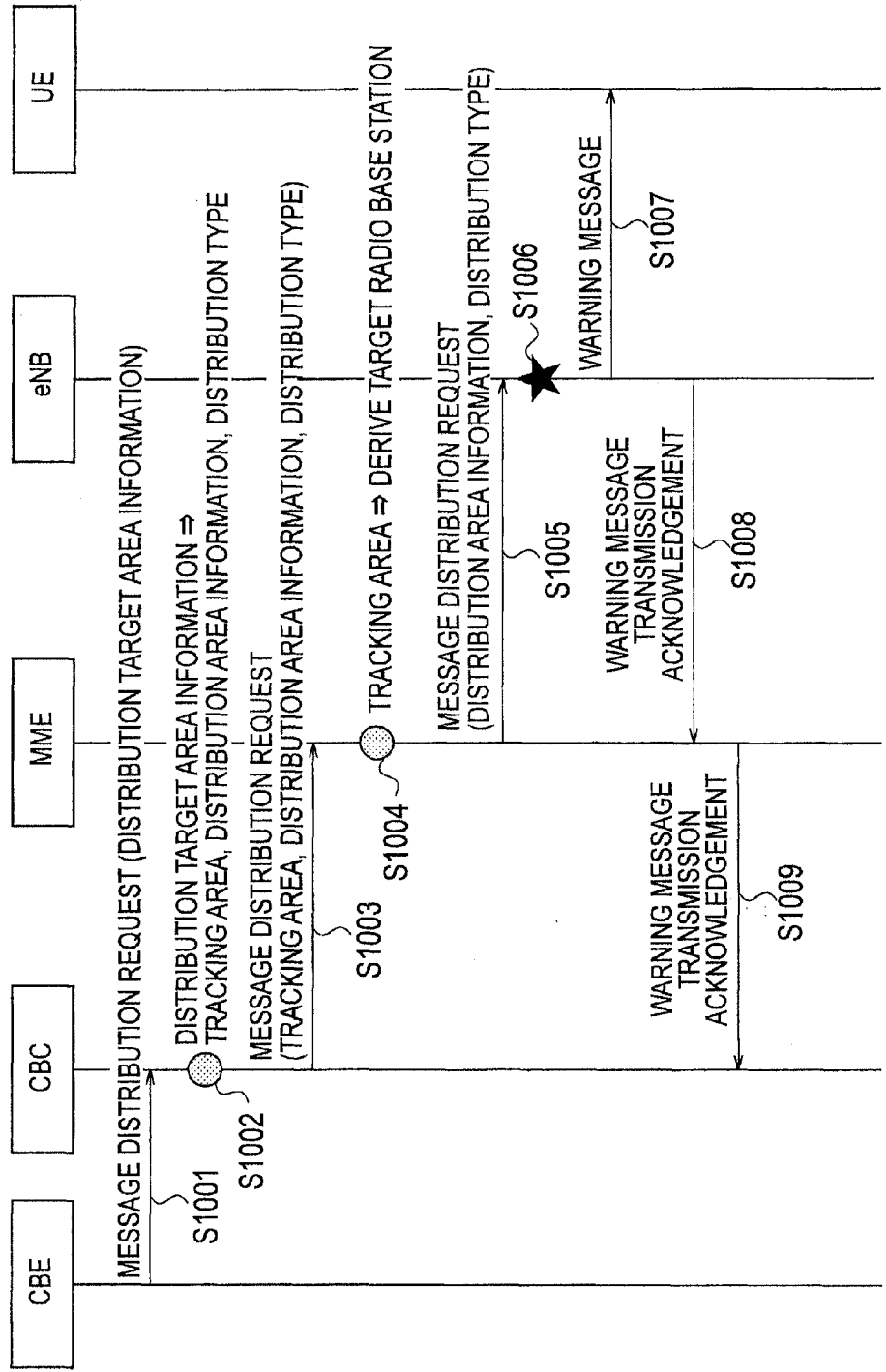
FIG. 5 is a sequence diagram showing the operation of the message distribution system according to the first embodiment of the present invention.

As shown in FIG. 5, in step S1001, the flash report transmission station CBE transmits, to the message distribution station CBC, a message distribution request for requesting distribution of a warning message.

In step S1002, the message distribution station CBC determines one or multiple tracking areas, the distribution area information, and the distribution type, based on the distribution target area information contained in the message distribution request.

Specifically, the message distribution station CBC determines the tracking area and the distribution area information (identifier which identifies the radio area in each radio base station eNB belonging to the tracking area), based on the distribution target area information contained in the message distribution request.

The message distribution station CBC also determines the distribution type indicating the type of distribution area information, based on the information such as the type of distribution target area information.

In step S1003, the message distribution station CBC transmits, to the mobile control apparatus MME corresponding to the tracking areas, a message distribution request containing the above-mentioned tracking areas, distribution area information, and distribution type.

In step S1004, the mobile control apparatus MME identifies the radio base station eNB belonging to the tracking areas contained in the received message distribution request.

In step S1005, the mobile control apparatus MME transmits, to the identified radio base station eNB, a message distribution request containing the distribution area information and the distribution type.

In step S1006, the radio base station eNB refers to the table corresponding to the distribution type contained in the received message distribution request and thus determines the distribution area associated with the distribution area information contained in the message distribution request.

Note that, when the distribution type contained in the received message distribution request is a "predetermined type", the radio base station eNB may determine any cells or all the cells under control of the radio base station eNB as the distribution area for the warning message.

The radio base station eNB distributes the warning message to the mobile stations in the determined distribution area in step S1007, and transmits a warning message transmission acknowledgement indicating the distribution to the mobile control apparatus MME in step S1008.

Here, the radio base station eNB may be configured to preferentially distribute a warning message according to a message distribution request which is determined to be processed preferentially.

In step S1009, the mobile control apparatus MME forwards the warning message transmission acknowledgement received from the radio base station eNB, to the message distribution station CBC.

(Operations and Effects of Message Distribution System according to First Embodiment of the Present Invention)

According to the message distribution system according to the first embodiment of the present invention, the message distribution station CBC can flexibly switch the unit of distribution area for warning messages on the basis of a combination of a distribution type and distribution area information.

Also, the message distribution system according to the first embodiment of the present invention makes it possible to achieve the preferential control in the radio base station eNB by using a distribution type.

That is to say, for example, when distribution area information is an area type which is used for a warning message with a high urgency, such a warning message can be preferentially processed in the radio base station in distinction from the other processing, such as those on warning messages with a low urgency.

(Modifications)

The message distribution station CBC may determine the distribution type based on information other than the distribution area information. For example, the message distribution station CBC may set a distribution type for each flash report transmission station CBE which is a transmission source of a warning message.

In this case, since a distribution type is specified for each flash report transmission station CBE, the message distribution station CBC does not require a function of determining the distribution type based on the distribution area information, thus high-speed processing can be achieved.

Note that operation of the above described message distribution station CBC, the radio base station eNB, the mobile station UE may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the message distribution station CBC, the radio base station eNB, the mobile station UE. Also, the storage medium and the processor may be provided in the message distribution station CBC, the radio base station eNB, the mobile station UE as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A warning message distribution method for distributing a warning message to a mobile station (UE) in a distribution area in a mobile communication system defined by the 3GPP, comprising the steps of:

(A) determining, at a message distribution station (CBC), distribution area information and a distribution type, when the message distribution station (CBC) receives a message distribution request containing distribution target area information from a flash report transmission station (CBE), and reporting, from the message distribution station (CBC) to a radio base station (eNB) via a mobile control apparatus (MME), the distribution area information and the distribution type; and (B) determining, at the radio base station (eNB), the distribution area, based on the reported distribution area information and the distribution type, and distributing, from the radio base station (eNB) to the mobile station (UE) in the distribution area, the warning message, wherein, in the step (B), the radio base station (eNB) determines whether or not to preferentially distribute the warning message based on the reported distribution type.

2. The message distribution method according to claim 1, wherein the step (A) comprises the steps of:

determining, at the message distribution station (CBC), a tracking area, based on the message distribution request, and reporting, from the message distribution station (CBC) to the mobile control apparatus (MME) corresponding to the distribution target area; and reporting, from the mobile control apparatus (MME) to the radio base station (eNB) belonging to the tracking area, the distribution area information and the distribution type.

* * * * *